J. M. VORIS.
Sawing-Machines.
No. 154,199. Patented Aug. 18, 1874.
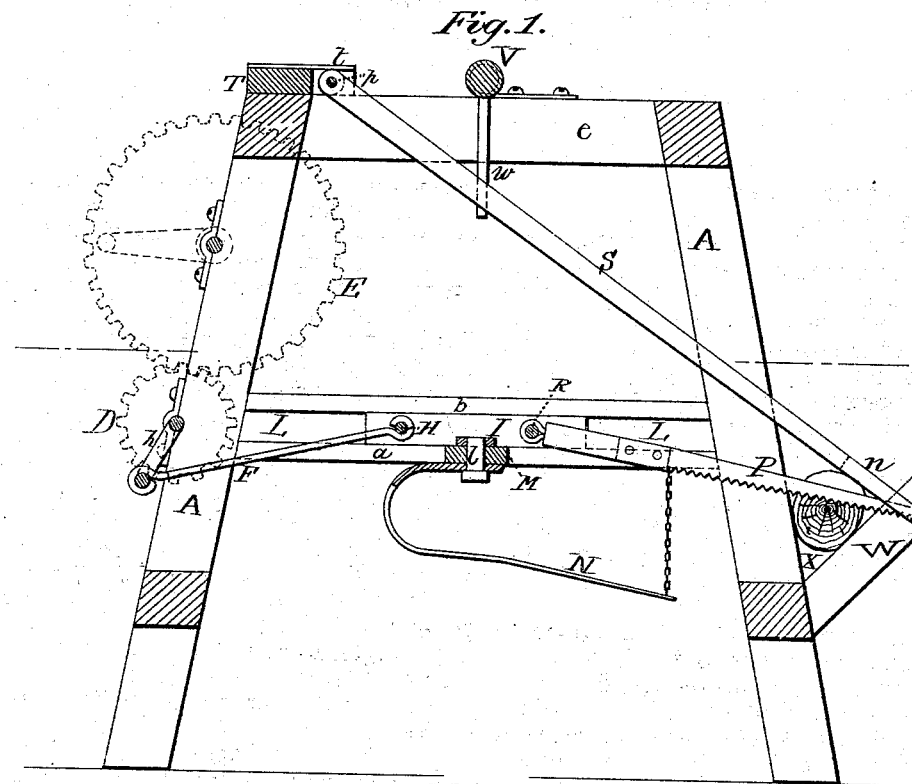
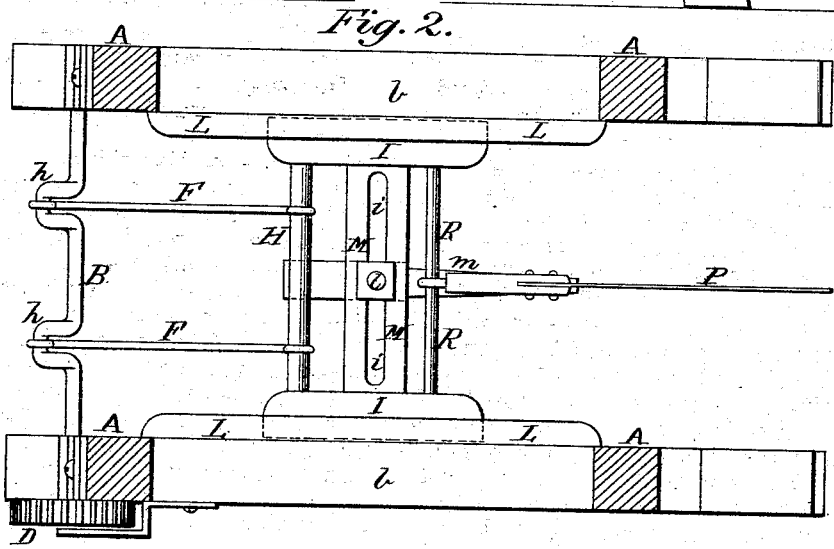
Witnesses.  
Wm Howard  
Dennis Finney
Inventor.  
John M. Voris  
By Cox and Cox  
his Attys.

UNITED STATES PATENT OFFICE.

JOHN M. VORIS, OF CHILLICOTHE, MISSOURI.

IMPROVEMENT IN SAWING-MACHINES.

Specification forming part of Letters Patent No. 154,199, dated August 18, 1874; application filed February 10, 1874.

*To all whom it may concern:*

Be it known that I, JOHN M. VORIS, of Chillicothe, Missouri, have invented certain new and useful Improvements in Sawing-Machines, of which the following is a specification, reference being had to the accompanying drawings.

The invention relates to a device for sawing wood; and consists in a drag-saw having a downward pressure and adjustable upon a bar having a reciprocal movement between guides by means of a double-pitman shaft, operated in any suitable manner.

To control the movement of the saw, a swinging adjustable guide is provided, which is retained in any desired position by a rack, between the teeth of which the guide may be placed.

The object of the invention is to provide a convenient means of sawing wood for fuel or other purposes, of any desired length.

Figure 1 is a vertical central longitudinal section of a device embodying the elements of the invention. Fig. 2 is a transverse central section of same.

In the accompanying drawings, A represents the uprights of a frame proper, braced by the bars a b, respectively, on their ends and sides, their tops being connected by the braces e, one of which not shown. Midway of their height is secured to the rear uprights the shaft B, one end of which projects beyond the side of the frame and is furnished with the cog-wheel D, into which meshes the driving cog-wheel E, of greater diameter, and appropriately placed above the wheel D. The shaft B is furnished at equal distances from its bearings with the coincident pitman-cranks h, which are properly separated, and to which are attached the rods F connecting the pitmen with the cross-bar H, which is secured upon each side to the guides I working in the opposite and parallel guide-slots L on the inside of the bars b, the middle of these guides being connected by the brace M, provided with the longitudinal slot i, in which is placed a bolt, l, having a nut on its upper end, which rests upon the top of the brace, its lower end passing through the upper front end of the spring N, which curves to the rear and thence extends forward a proper distance, its front lower end being connected by a chain or other suitable means with the shank of the drag-saw P, so as to give the saw a downward pressure. The front parts of the guides I are connected by the rod R, which passes through a loop, m, on the haft of the saw P, so that it can be adjusted to any desired position upon the rod. The saw P projects forward a proper distance and passes through an open vertical slot, n, in the lower end of the guide S, which is pivoted at its rear end to slide upon the rod p connecting the shoulders of a recessed plate, T, moving in guides t upon the upper part of the rear of the frame. A proper distance in front of the plate T is placed the rack V, working so tightly in bearings on the bars e that when turned it will retain its position. The teeth w of the rack project at right angles from its bar, and are of sufficient length to reach beyond the lower side of the guide S, and so control its position. The front of the frame may be provided with the pieces W, which project diagonally upward from the front surface of the uprights A, so as to form therewith a convenient crotch, X, to hold the wood to be operated upon.

The length at which the wood is to be cut having been determined, the rack V is raised. The saw P and spring N are then moved to a point opposite that which is distant from the vertical plane of the outer surface of one of the front uprights A a space equal to the length at which it is desired to cut the wood. The rack V is then turned until one of its teeth, w, is on each side of the guide S, which, by means of the open slot in its lower end, serves to direct the saw P, which is raised, and the wood placed in the crotches X, when the operation may be accomplished by rotating the wheel D, actuating the saw through the intermediate mechanism of the pitman cranks and guides, the former serving to give the saw a positive motion wherever placed upon the rod R, while the spring N gives it a downward bearing upon the wood.

If it is desired to extend the operation of the guide S, it is only necessary to force the plate T forward, or, when it is desired to remove the guide from an operative position, to draw the plate back, whereby the guide is sustained clear of the saw.

The purpose of the spring N may be accomplished by a weight placed upon the haft of the saw, or thereabout.

What I claim as my invention, and desire to secure by Letters Patent, is—

1. The saw P, adjustable upon the rod R and provided with the spring N adjustable in the slotted brace M, in combination with the guide S adjustable upon the rod P, substantially as shown and described.

2. The guide S, adjustable upon the rod $p$ attached to the plate T, in combination with the rack V, substantially as shown and described, for the uses specified.

3. The guide S, adjustable upon the rod $p$ attached to the plate T, in combination with the saw P, adjustable upon the rod R, substantially as shown and described.

In testimony that I claim the foregoing improvements in sawing-machines, as above described, I have hereunto set my hand and seal this 13th day of January, 1874.

JOHN M. VORIS. [L. S.]

Witnesses:
WILLIAM K. CRELLIN,
WILLIAM T. VORIS.